United States Patent
Leusink et al.

(10) Patent No.: US 10,220,943 B2
(45) Date of Patent: Mar. 5, 2019

(54) AIRCRAFT ROTOR BLADE OF SHAPE ADAPTED FOR ACOUSTIC IMPROVEMENT DURING APPROACH FLIGHTS AND FOR IMPROVING PERFORMANCE IN HOVERING FLIGHT AND IN FORWARD FLIGHT

(71) Applicant: AIRBUS HELICOPTERS, Marignane (FR)

(72) Inventors: Debbie Leusink, Aix en Provence (FR); David Alfano, Aix en Provence (FR); Vincent Gareton, Ensues la Redonne (FR)

(73) Assignee: AIRBUS HELICOPTERS, Marignane (FR)

( * ) Notice: Subject to any disclaimer, the term of this patent is extended or adjusted under 35 U.S.C. 154(b) by 177 days.

(21) Appl. No.: 15/370,426

(22) Filed: Dec. 6, 2016

(65) Prior Publication Data
US 2017/0174340 A1    Jun. 22, 2017

(30) Foreign Application Priority Data
Dec. 21, 2015  (FR) ...................... 15 02660

(51) Int. Cl.
*B64C 27/46* (2006.01)
*B64C 27/473* (2006.01)
(Continued)

(52) U.S. Cl.
CPC ............ *B64C 27/473* (2013.01); *B64C 27/04* (2013.01); *B64C 27/463* (2013.01); *B64C 27/467* (2013.01)

(58) Field of Classification Search
CPC ..... B64C 27/04; B64C 27/463; B64C 27/467; B64C 27/473
(Continued)

(56) References Cited

U.S. PATENT DOCUMENTS 4,248,572 A    2/1981  Fradenburgh
5,209,643 A    5/1993  Cole
(Continued)

FOREIGN PATENT DOCUMENTS

CN    102556344 A    7/2012
CN    203078757 U    7/2013
(Continued)

OTHER PUBLICATIONS

Japanese Office Action for Application No. 2016-238613, dated Nov. 28, 2017, 2 Pages.
(Continued)

*Primary Examiner* — Nathaniel Wiehe
*Assistant Examiner* — Muhammed Raji
(74) *Attorney, Agent, or Firm* — Brooks Kushman P.C.

(57) ABSTRACT

A blade of a rotor for a rotary wing aircraft. The blade presents a combination of relationships for variation in the sweep, the chord, and the twist of the airfoil profiles of the sections of the blade in order, firstly to improve the aerodynamic performance of the blade both in forward flight and in stationary flight, and secondly to reduce the noise given off during approach flight. The blade is double-tapered and presents three sweeps. The twist relationship is substantially constant over a first portion of the blade, and then decreases over the remainder of the blade in linear or in non-linear manner. Suitable variation in the gradient of the twist of the blade makes it possible to improve the aerodynamic performance of the blade in forward flight and in hovering flight.

18 Claims, 3 Drawing Sheets

(51) Int. Cl.
B64C 27/467 (2006.01)
B64C 27/04 (2006.01)

(58) Field of Classification Search
USPC .......................................................... 416/238
See application file for complete search history.

(56) References Cited

U.S. PATENT DOCUMENTS

| | | | |
|---|---|---|---|
| 5,332,362 A | 7/1994 | Toulmay et al. | |
| 6,000,911 A | 12/1999 | Toulmay et al. | |
| 6,116,857 A * | 9/2000 | Splettstoesser | B64C 27/467 416/228 |
| 6,364,615 B1 | 4/2002 | Toulmay et al. | |
| 6,497,385 B1 * | 12/2002 | Wachspress | B64C 27/28 244/17.11 |
| 7,252,479 B2 | 8/2007 | Bagai et al. | |
| 7,331,765 B2 * | 2/2008 | Falchero | B64C 27/467 416/228 |
| 8,128,376 B2 * | 3/2012 | Karem | B64C 27/467 416/228 |
| 9,162,749 B2 | 10/2015 | Gervais et al. | |
| 2005/0158175 A1 | 7/2005 | Falchero et al. | |
| 2006/0269418 A1 | 11/2006 | Bagai et al. | |
| 2007/0110582 A1 | 5/2007 | Bagai et al. | |
| 2009/0169381 A1 | 7/2009 | Jaenker et al. | |
| 2012/0237354 A1 | 9/2012 | Brocklehurst | |
| 2012/0251326 A1 | 10/2012 | Schimke et al. | |
| 2015/0050137 A1 | 2/2015 | Gervais et al. | |

FOREIGN PATENT DOCUMENTS

| | | |
|---|---|---|
| CN | 104149967 A | 11/2014 |
| EP | 0084946 | 8/1983 |
| EP | 0565413 | 10/1993 |
| EP | 0592764 A1 | 4/1994 |
| EP | 0842846 | 5/1998 |
| EP | 1557354 | 7/2005 |
| EP | 2505500 | 10/2012 |
| GB | 2170868 A | 8/1986 |
| JP | S61181798 A | 8/1986 |
| JP | H06016190 A | 1/1994 |
| JP | H11099994 A | 4/1994 |
| JP | H11139397 A | 5/1999 |
| JP | 2000118499 A | 4/2000 |
| JP | 2002284099 A | 10/2002 |
| JP | 2002308192 A | 10/2002 |
| JP | 2005206148 A | 8/2005 |
| JP | 2008542110 A | 11/2008 |
| JP | 2012116477 A | 6/2012 |

OTHER PUBLICATIONS

Japanese Office Action for Application No. 2016-238637, dated Nov. 29, 2017, 5 Pages.
Canadian Office Action for Application No. 2,951,069, dated Nov. 28, 2017, 4 Pages.
Canadian Office Action for Application No. 2,951,073, dated Nov. 28, 2017, 5 Pages.
French Search Report for French Application No. FR 1502660, Completed by the French Patent Office, dated Sep. 1, 2016, 8 Pages.
Massaro et al. 37th European Rotorcraft Forum 2011, ERF Sep. 13, 2011, 13 Pages, "Multiobjective-Multipoint Rotor Blade Optimization in Forward Flight Conditions Using Surrogate-Assisted Memetic Algorithms".
French Search Report for French Application No. FR 1502662, Completed by the French Patent Office, dated Aug. 17, 2016, 6 Pages.
Non-Final Office Action for U.S. Appl. No. 15/370,403, dated Sep. 28, 2018, 26 pages.
First Office Action for Chinese Application No. 201611178763.0, dated Sep. 3, 2018, 7 pages.
First Office Action for Chinese Application No. 201611178482.5, dated Sep. 3, 2018, 9 pages.

* cited by examiner

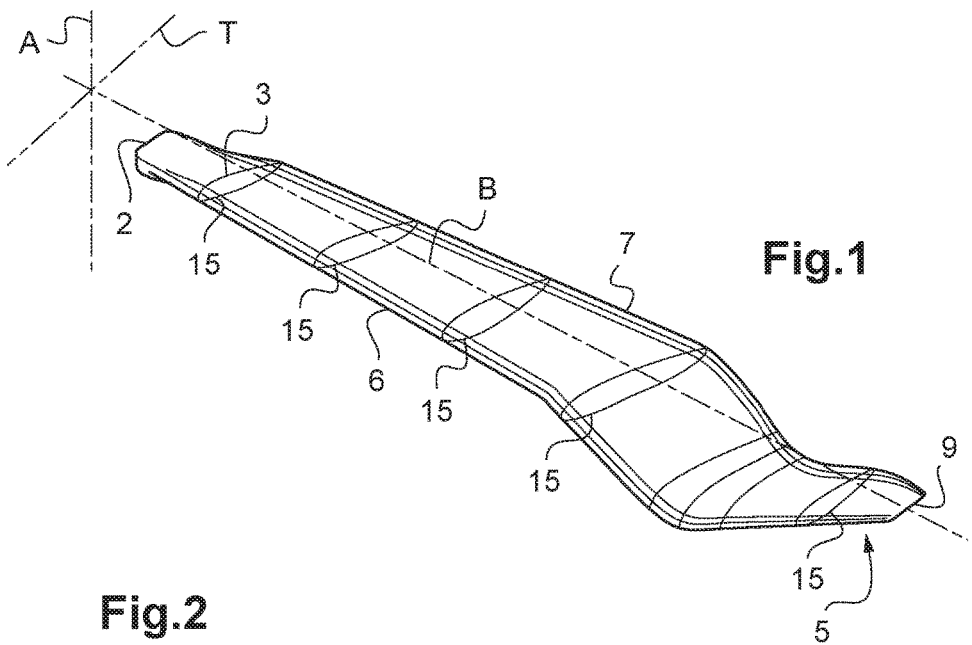
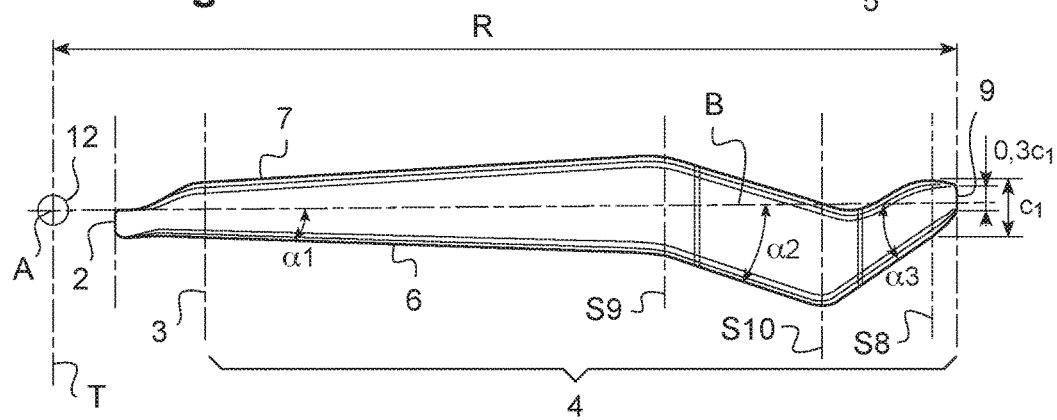
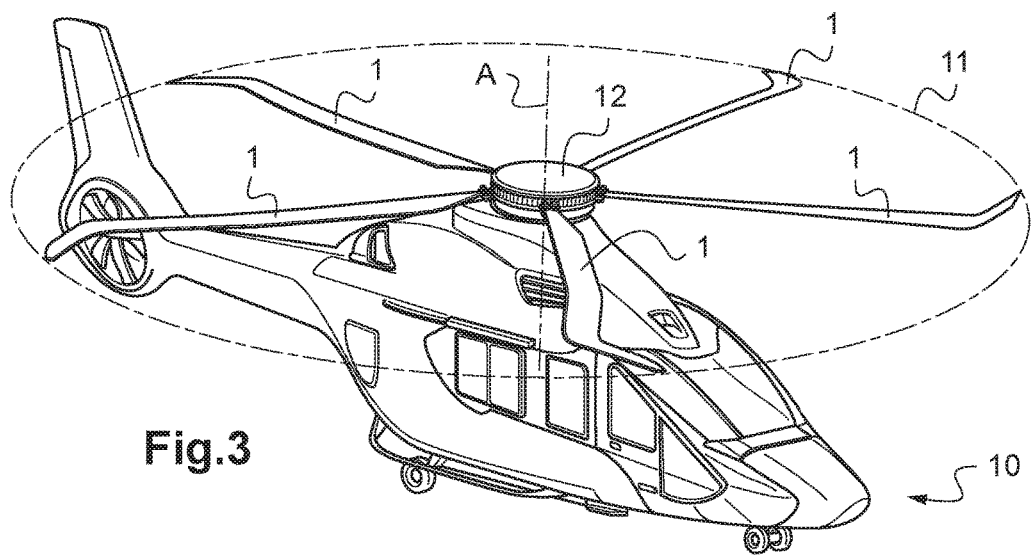

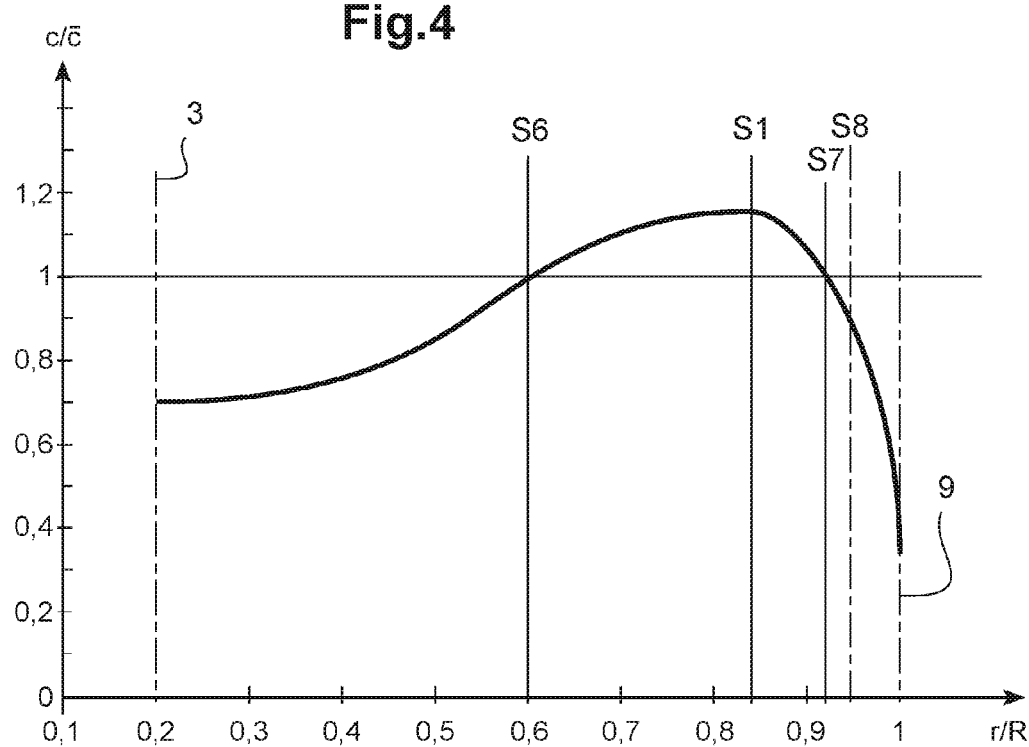
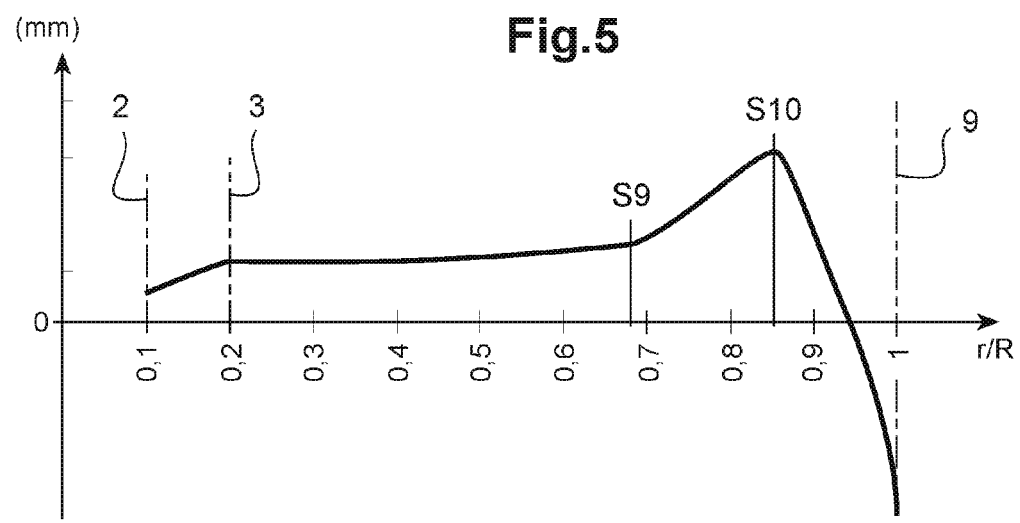

AIRCRAFT ROTOR BLADE OF SHAPE ADAPTED FOR ACOUSTIC IMPROVEMENT DURING APPROACH FLIGHTS AND FOR IMPROVING PERFORMANCE IN HOVERING FLIGHT AND IN FORWARD FLIGHT

CROSS REFERENCE TO RELATED APPLICATION

This application claims priority to French patent application No. FR 15 02660 filed on Dec. 21, 2015, the disclosure of which is incorporated in its entirety by reference herein. This application is related to U.S. application Ser. No. 15/370,403 entitled "AN AIRCRAFT ROTOR BLADE OF SHAPE ADAPTED FOR ACOUSTIC IMPROVEMENT DURING AN APPROACH FLIGHT AND FOR IMPROVING PERFORMANCE IN FORWARD FLIGHT" filed on Dec. 6, 2016.

BACKGROUND OF THE INVENTION (1) Field of the Invention

The present invention relates to the field of lift-generating airfoil surfaces and more particularly to airfoil surfaces forming a rotary wing.

The present invention relates to a blade for a rotary wing aircraft rotor and to a rotor having at least two such blades. The blade is intended more particularly for a main rotor for providing a rotary wing aircraft with lift and possibly also with propulsion.

(2) Description of Related Art

Conventionally, a blade extends longitudinally along its span from a first end for fastening to a rotary hub of a rotor to a second end referred to as its "free" end. Relative to the rotor, it can be understood that the blade extends radially from the first end towards the second end in a spanwise direction. Furthermore, the blade extends transversely from a leading edge towards a trailing edge of the blade along the chord of the blade.

The blade is thus driven in rotation by a rotary hub of the rotor. The axis of rotation of the hub thus corresponds to the axis of rotation of the blade.

The first end is generally referred to below by the term "blade start", while the free second end is referred to by the term "blade tip".

In operation, each blade of a rotor is subjected to aerodynamic forces, in particular an aerodynamic lift force during the rotary motion of the rotor, which force serves to provide the aircraft with lift, or indeed with propulsion.

For this purpose, the blade has an airfoil portion situated between the blade start and the blade tip. This airfoil portion is constituted by a succession of airfoil profiles along the span direction, which airfoil profiles are often referred to below for short as "profiles". Each profile is situated in a transverse plane that is generally perpendicular to the span direction and it defines a section of the blade, being arranged between the start of the airfoil portion and the blade tip. The airfoil portion provides substantially all of the lift of the blade.

The shape of the transition zone between the blade start and the start of the airfoil portion is generally imposed by manufacturing constraints and by structural constraints concerning the blade. This transition zone between the blade start and the start of the airfoil portion may be referred to by the term "blade root" and its aerodynamic performance is much less than the aerodynamic performance of the airfoil portion. The start of the airfoil portion is thus situated between the blade start and the blade tip, in the vicinity of the blade root. This transition zone may nevertheless generate some lift force. In addition, this transition zone, which is situated in the vicinity of the hub of the rotor, nevertheless provides some small contribution to the total lift of the blade, regardless of its aerodynamic shape.

For example, the profiles of the sections of the blade in the airfoil portion are characterized by a thin trailing edge, ideally of zero thickness, whereas the trailing edge in the vicinity of the blade start and of the transition zone between the blade start and the start of the airfoil portion is thick, and possibly rounded.

A rotary wing aircraft presents the advantage of being capable of flying both with high forward speeds during cruising flight and also with forward speeds that are very low, and it is also capable of performing hovering flight. A rotary wing aircraft thus presents the advantage of being able to land on zones of small area and thus, for example, closer to inhabited areas or indeed on landing decks or pads.

Nevertheless, forward flight at high speeds requires the blades to have aerodynamic characteristics that may be different from, or even unfavorable for the characteristics needed for flight at very low forward speeds and for hovering flight.

Likewise, the aerodynamic characteristics of blades also influence the noise generated by blades. Such noise can be problematic during stages of approaching and landing because of the proximity of inhabited areas. Furthermore, strict acoustic certification standards lay down sound levels with which rotary wing aircraft are required to comply.

For a predetermined selection of airfoil profiles, the geometrical characteristics of a blade that have an influence on the aerodynamic performance of the blade during forward flight at high speeds and during hovering flight and also on the acoustic signature of the blade are constituted in particular by the chords of the airfoil profiles of the sections of the blade, by the sweep of the blade, and by the twist of the blade.

It should be recalled that the chord is the distance between the leading edge and the trailing edge of the profile of a blade section. This chord may vary along the span of the blade. The term "taper" is generally used to designate a reduction in chords going along the span of the blade, however this term can also designate an increase in chords along the span of the blade.

Sweep may be defined as the angle formed by the leading edge of the blade with a particular axis of the blade. By convention, in a zone with forward sweep the leading edge forms a sweep angle relative to said blade axis that is positive in the direction of rotation of the rotor, whereas in a zone with backward sweep the leading edge forms a sweep angle relative to said blade axis that is negative. Said blade axis generally coincides with the pitch or feathering axis of the blade.

The twist of a blade consists in varying the setting of the profiles of the sections of the blade along the span of the blade. The term "setting" designates the angle formed between the chord of each profile of the sections of the blade relative to a reference plane of the blade, and this angle is referred to as the "twist" angle. By way of example, the reference plane may be the plane perpendicular to the axis of rotation of the blade and including said blade axis.

The term "twist relationship" designates how the twist angle varies along the span of the blade. In conventional manner, twist is measured as being negative when the leading edge of a section profile of the blade is lower than said reference plane.

Effective solutions are known for independently improving the performance of a blade for high-speed forward flight and the performance of a blade for hovering flight, as well as the acoustic performance of the blade during approach stages.

For example, improving the aerodynamic performance of a blade for hovering flight is characterized by reducing the power drawn by the blade for unchanging rotor lift. This improvement can be obtained by passive changes to the shape of the blade, in particular by increasing its twist.

An appropriate increase in the twist of the blade enables lift to be distributed more uniformly over the entire surface area of the blade and consequently of the rotor, thereby making it possible to reduce the power absorbed by each blade of the rotor in hovering flight. It should be recalled that increasing twist consists in lowering the leading edge relative to said reference plane and doing so more towards the blade tip than towards the blade start because of the variation in the circumferential speed of the air stream as a function of span. The aerodynamic performance of the blade in hovering flight is increased in particular by making the speeds induced along the span of the blade more uniform in this way.

Nevertheless, when the rotary wing aircraft is traveling at high speed, a large amount of blade twist can lead to the blade tip having negative lift, i.e. generating a lift force that is in the same direction as gravity, for a blade that is in an azimuth position known to the person skilled in the art as an "advancing" blade. The aerodynamic performance of the blade is thus degraded in forward flight. Furthermore, the levels of the aerodynamic loads to which the blade is subjected and also the levels of vibration are likewise greatly increased during forward flight.

Adding a dihedral at the blade tip also serves to improve the aerodynamic performance of the blade in hovering flight. A dihedral is formed by a blade surface at the blade tip that slopes upwards or downwards. In hovering flight, the dihedral serves to ensure that the tip vortex generated by any one blade has reduced influence on the following blades of the rotor. Nevertheless, such a dihedral may give rise to a reduction in the aerodynamic performance of the blade in forward flight and also to an increase in vibration.

Furthermore, improving the aerodynamic performance of a blade in forward flight is characterized by reducing the power consumed by each blade of the rotor for given lift and forward speed. This improvement may be obtained by passive modifications to the shape of the blade, and in particular by modifying its chord along the span of the blade and/or by decreasing its twist.

For example, the chord of profiles of sections of the blade increases going from the blade start along the span, and then it decreases before reaching the blade tip. The blade is said to be a "double-tapered" blade. Document EP 0 842 846 describes a double-tapered blade in which the maximum chord is situated at a distance lying in the range 60% to 90% of the total span of the blade from the axis of rotation of the blade.

Nevertheless, the use of a double-tapered blade often gives rise to an increase in noise during approach flight as a result in the increasing intensity of vortices given off by and then impacting against each blade. The use of such a double taper also gives rise to degraded performance in hovering flight compared with a blade having the same twist and the same "blade solidity", which term designates the ratio of the total area occupied by the blades of the rotor seen from above to the area of the rotor disk, i.e. the area that is swept by a blade of the rotor on rotating through one revolution.

Furthermore, and in compliance with the above, a decrease in the twist of the blade leads to an increase in the aerodynamic angles of attack at the blade tip on the advancing blade side. The angles of attack for a non-twisted blade tip are thus closer to zero on the advancing blade side, thus serving firstly to reduce the negative lift at the blade tip on the advancing blade side and also to reduce local drag, in particular the drag associated with the appearance of shock waves.

In contrast, reducing twist at the end of the blade leads to a reduction in the stall margin of the blade on the retreating blade side. In addition, this reduction in the twist of the blade is unfavorable in hovering flight, as mentioned above.

Documents U.S. Pat. No. 7,252,479 and EP 0 565 413 describe a blade adapted to high-speed forward flight, combining a double-tapered blade with a twist relationship.

Finally, the improvement in acoustic performance of a blade during approach flight may be characterized by reducing the noise that is generated by the interaction between the blade and the air vortex generated by the preceding blades of the rotor. This improvement may be obtained by passive modifications to the shape of the blade, in particular by modifying its sweep along its span.

By way of example, as described in Documents EP 1 557 354, US 2012/0251326, and U.S. Pat. No. 6,116,857, a blade with a first zone that is forwardly-swept and a second zone that is backwardly-swept avoids the leading edge of a blade in these first and second zones being parallel to the lines of vortices given off by the preceding blades. Such a blade can thus limit interactions between the blade and these vortices, e.g. reducing the intensity of impulse noise associated with the interaction between the blade and the vortices, and consequently limiting the appearance of noise.

Furthermore, that blade with two sweeps may also include taper in the backwardly-swept second zone that also serves to reduce the noise level generated in flight. Specifically, for a given profile, the thickness of the blade decreases with shortening chord, thereby decreasing the appearance of so-called "thickness" noise. Likewise, since the area of the blade is reduced as a result of its taper, its lift is also modified, which can reduce the appearance of so-called "load" noise.

It is also possible to act on the aerodynamic load at the blade tip in order to modify the vortices given off in the wake of the blade, and consequently reduce the sound level of the blade. For this purpose, the relationships for variation in the twist and in the chord of the second profiles of the blades are modified. Nevertheless, such variations are incompatible with the above-mentioned optimizations concerning hovering flight or forward flight.

Furthermore, independently of the shape of the blade, it is also possible to modify the speed of rotation of the blade or indeed to adopt specific approach flight paths for the aircraft referred to as "least noise approach flight paths" in order to reduce the noise radiated to the ground by the blades of the aircraft.

Nevertheless, modifying the speed of rotation of the blade makes the work of dynamically balancing the blade more complex. Furthermore, a reduction in the speed of rotation of the blade can give rise in particular to an increase in aerodynamic stalls at the ends of the blade, and consequently to an increase in the dynamic control forces of the blade.

It is also possible to combine applying two sweeps with variations in the chord of the profiles of the sections of the blade with a twist relationship that is adapted either to hovering flight or else to forward flight. Thus, documents EP 1 557 354 and US 2012/0251326 describe blades that are adapted for hovering flight while also enabling a reduction in the noise generated during approach flights. Likewise, document EP 0 842 846 describes a blade that is adapted for forward flight at high speeds and that enables noise to be limited during approach flight.

Nevertheless, the aerodynamic performance of such blades is not optimized for the stage of flight for which the blades are not adapted. Significantly reducing the noise given off by a blade is in any event given precedence, and the aerodynamic performance of the blade may be degraded during certain stages of flight. This degradation is due in particular to a lack of twisting stiffness and/or of bending stiffness of the blade which can then deform under the aerodynamic and inertial forces to which it is subjected.

In contrast, optimizing blade profiles for high-speed forward flight is different and appears to go against optimizing those profiles for hovering flight. Optimizing profiles both for hovering flight and for high-speed forward flight is particularly complex to achieve, since the aerodynamic conditions encountered by the blade are different. Furthermore, during rotation of the rotor, the position of a blade alternates between advancing and retreating relative to the air stream, thereby increasing the differences between the aerodynamic conditions encountered by the blade.

Finally, the document entitled "Multiobjective-multipoint rotor blade optimization in forward flight conditions using surrogate-assisted memetic algorithms", given to the "European Rotorcraft Forum" at Gallarate (Italy) in September 2011 compares several methods of optimizing a blade in forward flight. The blade may have only a twist relationship, or it may present a combination of relationships for varying chord and sweep, or indeed it may present a combination of relationships for varying twist, chord, and sweep.

BRIEF SUMMARY OF THE INVENTION

An object of the present invention is to overcome the above-mentioned limitations and to propose a blade that improves the aerodynamic performance of the blade both in forward flight and in hovering flight and that is also capable of reducing the noise given off by the blade during an approach flight. The invention also relates to a rotor for a rotary wing aircraft having at least two such blades.

The present invention thus provides a blade for a rotor of a rotary wing aircraft, the blade being for rotating about an axis of rotation A, the blade extending firstly along a blade axis B between a blade start suitable for being connected to a hub of the rotor and a blade tip situated at a free end of the blade, and secondly along a transverse axis T substantially perpendicular to the blade axis B between a leading edge and a trailing edge, the blade comprising an airfoil portion situated between the blade start and the blade tip, the airfoil portion being constituted by a succession of airfoil profiles, each airfoil profile being situated in a transverse plane substantially perpendicular to the blade axis B and defining a section of the blade, the blade tip being situated at a reference distance equal to a rotor radius R from the axis of rotation A, a maximum distance between the leading edge and the trailing edge in the transverse plane constituting a chord c for each airfoil profile of the blade, a mean chord $\bar{c}$ being a mean value of the chord c over the airfoil portion, a forward first direction being defined from the trailing edge to the leading edge, and a rearward second direction being defined from the leading edge to the trailing edge.

The mean chord $\bar{c}$ is preferably defined by a radius squared $r^2$ weighting of the profile of each of the sections of the blade in application of the formula:

$$\bar{c} = \frac{\int_{R_0}^{R} L(r) \cdot r^2 \cdot dr}{\int_{R_0}^{R} r^2 \cdot dr}$$

where $L(r)$ is the length of the local chord of a profile of the blade situated at a radius r from the axis of rotation A, $R_0$ being the radius of the start of the airfoil portion, and R being the radius of the blade tip.

Nevertheless, the mean chord $\bar{c}$ may be defined by an arithmetic mean of the chord c of the sections of the blade over all of the airfoil portion of the blade.

This blade of the invention is remarkable in that it presents a combination of relationships for variation in its chord and in its twist, the twist being formed by angular variations between the airfoil profiles of the sections of the blade, the chord increasing between the start of the airfoil portion and a first section S1 situated at a first distance from the axis of rotation A lying in the range 0.6R to 0.9R, the chord decreasing beyond the first section S1, the twist of the profiles of the sections of the blade decreasing between a second section S2 situated at a second distance from the axis of rotation A lying in the range 0.3R to 0.4R and the blade tip, a first gradient of the twist lying in the range −25°/R to −4°/R between the second section S2 and a third section S3 situated at a third distance from the axis of rotation A lying in the range 0.4R to 0.6R, a second gradient of the twist lying in the range −25°/R to −4°/R between the third section S3 and a fourth section S4 situated at a fourth distance from the axis of rotation A lying in the range 0.65R to 0.85R, a third gradient of the twist lying in the range −16°/R to −4°/R between the fourth section S4 and a fifth section S5 situated at a fifth distance from the axis of rotation A lying in the range 0.85R to 0.95R, a fourth gradient of the twist lying in the range −16°/R to 0°/R between the fifth section S5 and the blade tip.

This blade of the invention is preferably for the main rotor providing a rotary wing aircraft with lift and possibly also with propulsion. The axis of rotation A of the blade corresponds to the axis of rotation of the hub of the rotor.

The airfoil portion of the blade provides the main part of the lift from the blade while the blade is rotating about the axis A. The start of this airfoil portion is characterized in particular by a thin trailing edge, whereas between the blade start and the start of the airfoil portion, the trailing edge is thick, or even rounded. The start of this airfoil portion is thus generally distinct from the blade start and is situated between the blade start and the blade tip, in the vicinity of the blade start.

The blade tip is situated at a reference distance equal to the rotor radius R from the axis of rotation A, and this rotor radius R is used for locating a profile or indeed a section of the blade along the blade axis B. For example, the blade start is situated at a sixth distance lying in the range 0.05R to 0.3R from the axis of rotation A and the start of the airfoil portion of the blade is situated at a seventh distance lying in the range 0.1R to 0.4R from the axis of rotation A. The seventh distance is greater than or equal to the sixth distance.

Likewise, the mean chord $\bar{c}$ of the blade over the airfoil portion is used to define the chord of each profile of the blade along its span.

In the relationship for variation in the chord of the profiles of the sections of the blade, the chord varies about the mean chord $\bar{c}$ by ±40% between the start of the airfoil portion and the first section S1. The chord thus varies over the range $0.6\bar{c}$ to $1.4\bar{c}$ respectively from the start of the airfoil portion to the first section S1. The variation in the chord may also be smaller between the start of the profile portion and the first section S1, in particular to penalize the aerodynamic performance of the blade during hovering flight to a smaller extent. By way of example, the chord may vary by ±20% about the mean chord $\bar{c}$ between the start of the airfoil portion and the first section S1.

In addition, the chords of the section profiles of the blade are preferably smaller than the mean chord $\bar{c}$ over a first portion of the blade, e.g. between the start of the airfoil portion of the blade and a sixth section S6 situated at an eighth distance from the axis of rotation A lying in the range 0.5R to 0.8R. The chords of the section profiles of the blade are then greater than the mean chord $\bar{c}$ between the sixth section S6 and a seventh section S7 situated at a ninth distance from the axis of rotation A lying in the range 0.85R to 0.95R, and then less than the mean chord $\bar{c}$ beyond the seventh section S7 to the blade tip. By way of example, the chord of the section profile of the blade in the vicinity of the start of the airfoil portion of the blade lies in the range $0.4\bar{c}$ to $0.9\bar{c}$, while the chord of the section profile of the blade at the blade tip may lie in the range $0.2\bar{c}$ to $0.8\bar{c}$.

Furthermore, the relationship for variation in the twist of the blade may be piecewise linear, i.e. between adjacent pairs of sections selected from the sections S2, S3, S4, and S5, and between the fifth section S5 and the blade tip, or it may be non-linear over all of the airfoil portion of the blade.

When the twisting relationship is piecewise linear, this twisting relationship is constituted by straight line segments, a segment characterizing variation of twist between two adjacent segments from among the sections S2, S3, S4, and S5, and between the fifth section S5 and the blade tip. The twist gradient, which is the local derivative of the twist along the span of the blade, then corresponds to the slopes of the straight lines supporting these segments. This twist gradient is then formed by discontinuous horizontal lines, a line being situated between adjacent sections and between the fifth section S5 and the blade tip.

Furthermore, in order to enable twist variation to be compatible both with hovering flight and with forward flight and also with the relationship for variation in chord, the first twist gradient situated between the second section S2 and the third section S3 is preferably less than the second twist gradient situated between the third section S3 and the fourth section S4, the second twist gradient is preferably greater than the third twist gradient situated between the fourth section S4 and the fifth section S5, and the third twist gradient is preferably less than the fourth twist gradient situated between the fifth section S5 and the blade tip.

When the twist relationship is non-linear over the airfoil portion, the twist gradient is preferably a curve that is continuous over the entire airfoil portion of the blade. The first twist gradient then reaches a first plateau lying in the range −25°/R to −15°/R in the vicinity of the third section S3, the second twist gradient reaches a second plateau lying in the range −14°/R to −4°/R in the vicinity of the fourth section S4, the third gradient of the twist reaches a third plateau lying in the range −16°/R to −6°/R in the vicinity of the fifth section S5, and the fourth gradient of the twist lies in the range −10°/R to 0°/R in the vicinity of the blade tip.

This twist relationship may correspond to a polynomial curve, e.g. a Bézier curve of order 6 or greater.

Preferably, the first plateau is equal to −18°/R, the second plateau is equal to −6°/R, the third plateau is equal to −13°/R, and the fourth plateau of the twist is equal to −8°/R at the blade tip.

Whatever the relationship for twist variation, the second distance may for example be equal to 0.35R, the third distance may be equal to 0.48R, the fourth distance may be equal to 0.78R, and the fifth distance may be equal to 0.92R.

The twist relationship defines only variation in the twist of the blade between the start of the airfoil portion and the blade tip, and it does not define the settings of the profiles of the sections of the blade. The settings of the profiles of the sections of the blade in the vicinity of the start of the airfoil portion have no direct influence on the aerodynamic behavior of the blade. Specifically, when in flight, the settings of the profiles of the sections of the blade in the vicinity of the start of the airfoil portion and all of the profiles of the blade along the airfoil portion depend on the adjustment of the collective pitch and on the adjustment of the cyclic pitch of the blade. It is thus indeed the variation in twist that characterizes the aerodynamic behavior of the blade, since the setting values of the profiles of the sections of the blades are taken into account by adjusting the collective pitch and by adjusting the cyclic pitch of the blade.

In addition, the zones of the blade situated in the proximity of the axis of rotation A, and in particular the zone situated between the axis of rotation A and the second section S2, are subjected little to aerodynamic forces during rotation of the blade. Twist in the proximity of the axis of rotation A thus has less influence on the aerodynamic behavior of the blade. As a result, the twist may be substantially constant or it may vary a little between the start of the airfoil portion and the second section S2 without significantly modifying the behavior and the aerodynamic performance of the blade. By way of example, the variation of the twist may be less than or equal to 2° between the start of the airfoil portion and the second section S2.

The combination of these relationships for variation in the chord and in the twist of the blade along its span advantageously enables the aerodynamic performance of the blade to be improved both during forward flight and during hovering flight. Specifically, twist is important in a first zone of the blade, e.g. in the range 0.3R to 0.7R, and thus serves to compensate for the small chord that is essentially less than the mean chord $\bar{c}$. Furthermore, the untwisting in a second zone of the blade, e.g. in the range 0.7R to 0.9R, is favorable to forward flight for an advancing blade, but gives rise to an increase in forces on a retreating blade. Advantageously, in this second zone, the chords of the profiles of the sections of the blade are essentially greater than the mean chord $\bar{c}$, thus making it possible to accommodate these increased forces without degrading the aerodynamic behavior of the retreating blade.

Furthermore, the chord may decrease in non-linear manner beyond the eighth section S8 to the blade tip, this eighth section S8 being situated at a tenth distance from the axis of rotation A lying in the range 0.9R to 0.95R. Preferably, the chords of the profiles of the sections of the blade decrease along a curve that is substantially parabolic beyond the eighth section S8. It is then possible to refer to a "parabolic" tip cap being present at the blade tip. Other non-linear shapes are also possible for this blade tip using polynomial curves such as a Bézier curve.

Under such circumstances, the chord of the profile of the section at the blade tip lies in the range $0.2c_1$ to $0.8c_1$ where $c_1$ is the value of the chord of the profile of the section of the blade at the eighth section S8, i.e. at the beginning of this zone of non-linear reduction in the chords of the profiles of the sections of the blade. The chord at the blade tip is preferably equal to $0.3c_1$.

In contrast, the combination of these relationships for variations in the chord and in the twisting of the profiles of the sections of the blade may give rise to a small increase in the noise generated by the blade, in particular during approach flights. Advantageously, a relationship for varying the sweep of the blade in combination with the relationship for varying its chord and its twist makes it possible firstly to compensate for this increase in the noise generated by the blade and secondly to reduce significantly the amount of noise that is generated by the blade during approach flights.

The relationships for variation in chord and in twist may then be combined with a relationship for variation in sweep. This relationship for variation in sweep causes the sweep of the blade to begin by being directed towards the front of said blade between the start of the airfoil portion and a ninth section S9 situated at an eleventh distance from the axis of rotation A lying in the range 0.5R to 0.8R, the leading edge forming a forward first sweep angle lying in the range 0° to 10° relative to the blade axis B. Thereafter, the sweep is directed towards the front of the blade between the ninth section S9 and a tenth section S10 situated at a twelfth distance from the axis of rotation A lying in the range 0.6R to 0.95R, the leading edge forming a forward second sweep angle lying in the range 1° to 15° relative to the blade axis B. Finally, the sweep is directed towards the rear of the blade between the tenth section S10 and the blade tip, the leading edge forming a backward third sweep angle lying in the range −35° to −15° relative to the blade axis B.

The relationship for variation in sweep thus defines a blade with three sweeps that serve advantageously to improve the acoustic signature of the blade. The forward first sweep angle is preferably strictly greater than 0°.

These three sweeps prevent the leading edge of a blade being parallel with the vortices given off by the preceding blade during rotation of a blade. These three sweeps thus enable the intensity of the acoustic energy that is generated by interaction between a blade and the air vortices given off by the preceding blades of the rotor to be decreased over a portion of the span of the blade, in particular during an approach flight.

In addition, the ends of the preceding blades give off vortices that form vortex lines of helical shape. It is then advantageous to limit the span portions of the leading edge of the blade that interact simultaneously with these vortex lines in order to limit the effect on the human ear of the noise generated.

Specifically, with a leading edge of the blade having a sweep angle that varies continuously over one or more zones defined by the ninth and tenth sections S9 and S10 and also by the blade tip, interaction between the leading edge and the vortices given off by the blades preceding a following blade take place simultaneously at a plurality of points on the leading edge giving rise to the appearance of acoustic energy. This results in impulse noise being given off that is troublesome for the human ear, with this phenomenon being penalizing for acoustic certification.

Advantageously, with a straight leading edge of the blade that slopes relative to the blade axis over each zone defined by the ninth and tenth sections S9 and S10 and by the blade tip, the interaction between the leading edge and these vortices takes place simultaneously at a smaller number of points along the leading edge. This results in a decrease in the impulse nature of the signal given off, making it less troublesome for the human ear.

Consequently, the leading edge of the blade is preferably straight and inclined over each zone defined by the ninth and tenth sections S9 and S10 and by the blade tip so as to reduce the acoustic energy perceived by an observer.

The sweep is thus preferably formed by a forward first sweep angle, a forward second sweep angle, and a backward third sweep angle, all three of which are constant respectively between the start of the airfoil portion and the ninth section S9, then between the ninth section S9, and the tenth section S10, and finally between the tenth section S10 and the blade tip.

Likewise, the forward first sweep angle $\alpha_1$ is preferably different from the forward second sweep angle $\alpha_2$ so as to guarantee that there are three distinct sweeps present along the blade of the invention.

In addition, the forward first sweep angle $\alpha_1$ may be strictly less than the forward second sweep angle $\alpha_2$ in order to guarantee progressiveness over the two forward sweep zones.

For example, the forward first sweep angle may be equal to 4°, the forward second sweep angle may be equal to 8°, and the backward third sweep angle may be equal to −23°.

In addition, the blade may include a dihedral beginning at the eighth section S8 and terminating at the blade tip. This dihedral preferably slopes downwards and serves to improve the aerodynamic performance of the blade in hovering flight.

Furthermore, it is also possible to combine solely the above-described relationships for variation in the sweep and in the chord of the section profiles of the blade. This makes the blade structurally easier to make. A blade using this combination is then adapted to improve its aerodynamic performance in forward flight while reducing the noise given off during approach flight.

The present invention also provides a rotor for a rotary wing aircraft. The rotor has at least two blades as described above. The rotor is more particularly intended to be a main rotor of a rotary wing aircraft for providing it with lift and possibly with propulsion.

BRIEF DESCRIPTION OF THE SEVERAL VIEWS OF THE DRAWINGS

The invention and its advantages appear in greater detail from the context of the following description of embodiments given by way of illustration and with reference to the accompanying figures, in which:

FIGS. 1 and 2 show a blade of the invention;

FIG. 3 shows an aircraft having a rotor made up of such blades;

FIG. 4 is a graph plotting variation in the chord of the profiles of the sections of the blade;

FIG. 5 is a graph plotting variation in the sweep of the blade;

DETAILED DESCRIPTION OF THE INVENTION

Figure 6:
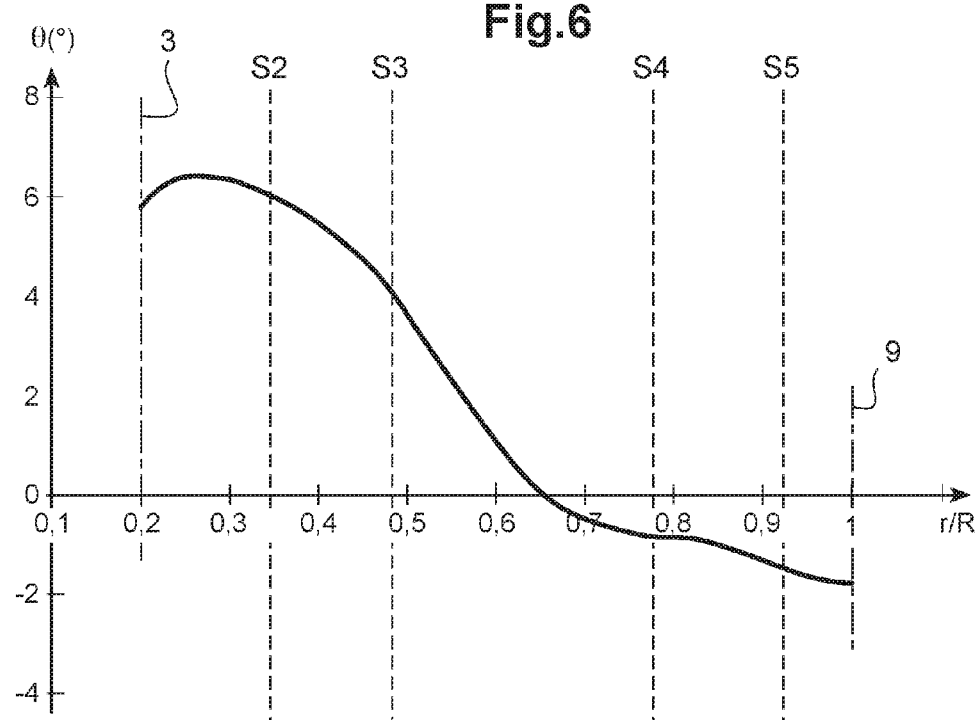
FIG. 6 is a graph plotting variation in the twist of the blade.

Elements present in more than one of the figures are given the same references in each of them.

FIGS. 1 and 2 show a blade 1 extending firstly spanwise along a blade axis B between a blade start 2 and a blade tip 9 and secondly along a transverse axis T perpendicular to the blade axis B between a leading edge 6 and a trailing edge 7.

The blade 1 has an airfoil portion 4 situated between the blade start 2 and the blade tip 9. The airfoil portion 4 is made up of a succession of airfoil profiles 15, each situated in a transverse plane substantially perpendicular to the blade axis B, each profile defining a section of the blade 1. The blade 1 also has a dihedral 5 at the free end of the blade 1, i.e. in the vicinity of the blade tip 9.

The blade 1 is for forming a rotor 11 of a rotary wing aircraft 10, as shown in FIG. 3. The rotor 11 comprises a hub 12 and five blades 1 that are for rotating about an axis of rotation A of the hub 12. Each blade 1 is connected to the hub 12 at the blade start 2.

The rotor 11 is characterized by a rotor radius R, i.e. the distance between the axis of rotation A and the blade tip 9 along the blade axis B. The chord c of the profiles 15 of each section of the blade 1 corresponds to the maximum distance between the leading edge 6 and the trailing edge 7 of the blade 1 in a transverse plane substantially perpendicular to the blade axis B. A mean chord $\bar{c}$ is defined as being the mean value of the chords c over the airfoil 4. The blade start 2 is situated at a sixth distance equal to 0.1R from the axis of rotation A and the start 3 of the airfoil 4 of the blade 1 is situated at a seventh distance equal to 0.2R from the axis of rotation A.

The blade 1 of the invention presents a combination of relationships for variation in its sweep, its chords, and its twist, firstly in order to reduce the noise given off by each blade of the rotor 11 during an approach flight and secondly for improving the aerodynamic performance of each blade 1, both during hovering flight and during forward flight of the aircraft 10.

The blade 1 may also present a combination solely of the relationships for variation in its chords and its twist in order to improve the aerodynamic performance of the rotor 11, both during hovering flight and during forward flight of the aircraft 10, but without taking account of the acoustic behavior of each blade 1.

The blade 1 may also present a combination of relationships for variation in its sweep and in its chords firstly in order to reduce the noise given off by each blade 1 of the rotor 11 during an approach flight, and secondly in order to improve the aerodynamic performance of each blade 1 in forward flight of the aircraft 10. The aerodynamic performance of each blade 1 is then optimized mainly for forward flight of the aircraft 10.

Figure 7:
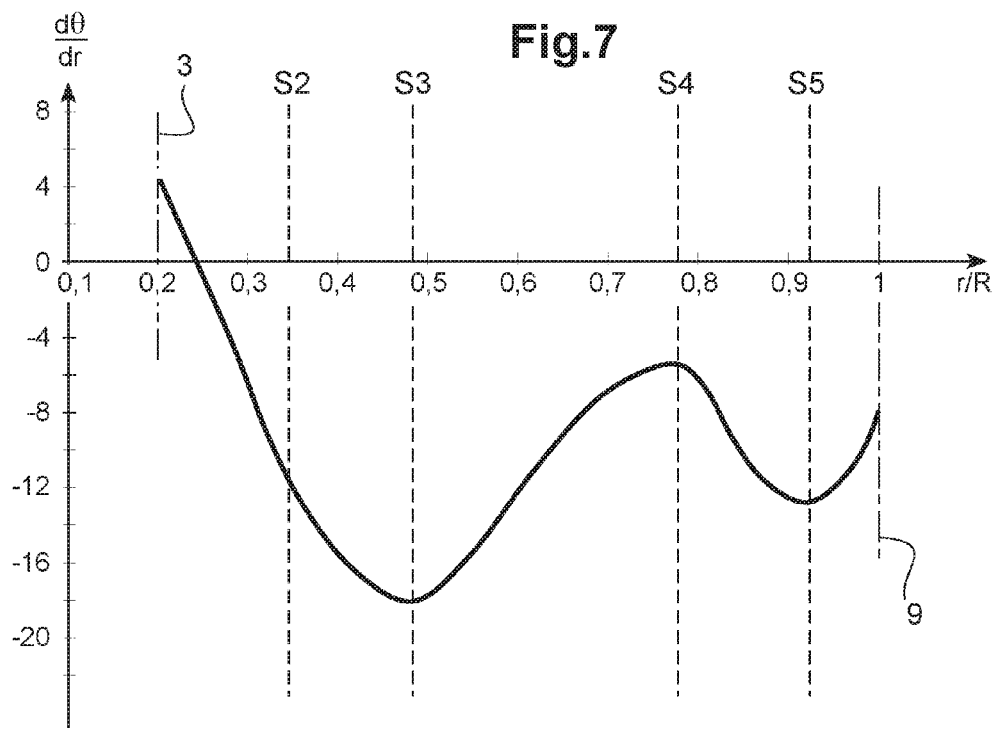
FIG. 7 is a graph plotting variation in the twist gradient of the blade.

The relationship for variation in the chord, the sweep, and the twist of the profiles 15 of the sections of the blade 1 are plotted respectively in FIGS. 4 to 6. FIG. 7 shows the twist gradient of the blade 1, i.e. the local derivative of the twist along the span of the blade 1 of the rotor 11 of rotor radius R.

The relationship for variation in the chord of the profiles 15 of the sections of the blade 1 shown in FIG. 4 comprises, plotted along the abscissa axis, the ratio of the positions of the profiles 15 of the sections of the blade 1 along the span of the blade 1 relative to the rotor radius R, and up the ordinate axis, the ratio of the chords c of the profiles 15 of the sections of the blade 1 relative to the mean chord $\bar{c}$.

The mean chord $\bar{c}$ is defined by a radius squared $r^2$ weighting of each profile 15 of the sections of the blade 1 in application of the following formula:

$$\bar{c} = \frac{\int_{R_0}^{R} L(r) \cdot r^2 \cdot dr}{\int_{R_0}^{R} r^2 \cdot dr}$$

where L(r) is the length of the local chord of a profile of the blade 1 situated at a radius r from the axis of rotation A, $R_0$ is the radius of the start 3 of the airfoil 4, and R is the radius of the blade tip 9.

In this relationship for variation in the chord, the chord c of the profile 15 of each section of the blade 1 increases between the start 3 of the airfoil portion 4 and a first section S1 situated at a first distance from the axis of rotation A that is equal to 0.85R. Beyond the first section S1, the chord decreases to the blade tip 9. It can be seen that the section c is less than the mean chord $\bar{c}$ between the start of the airfoil portion of the blade 1 and a sixth section S6 situated at an eighth distance from the axis of rotation A equal to 0.6R. Furthermore, the chord c varies between the start 3 of the airfoil portion 4 and the first section S1 from 0.87 to 1.27, which represents variation of ±20% about the mean chord $\bar{c}$. The chord at the blade start is equal to 0.37.

Thereafter, the chords of the profiles 15 of the sections of the blade 1 are greater than the mean chord $\bar{c}$ between the sixth section S6 and a seventh section S7 situated at a ninth distance from the axis of rotation A lying in the range 0.85R to 0.95R. Finally, the chords of the profiles 15 of the sections of the blade 1 are less than the mean chord $\bar{c}$ beyond the seventh section S7 to the blade tip 9.

In addition, the chord c decreases following a curve that is substantially parabolic beyond an eighth section S8 situated at a tenth distance equal to 0.95R. The end of the blade 1 thus forms a parabolic tip cap 8.

The relationship for twist of the blade 1 shown in FIG. 6 is a non-linear relationship corresponding to a polynomial curve. The ratio of the position of each profile 15 of the sections of the blade 1 along the span over the rotor radius R is plotted along the abscissa axis, and the twist angle θ of the profile 15 of each section of the blade 1 is plotted up the ordinate axis.

The twist gradient is shown in FIG. 7 and comprises, along the abscissa axis, the ratio of the position of the profile 15 of each section of the blade 1 along the span of the blade 1 over the rotor radius R, and, up the ordinate axis, the local derivative of the twist of the profile 15.

Initially, the twist angle θ varies little between the start 3 of the airfoil portion 4 and a second section S2 situated at a second distance from the axis of rotation A equal to 0.35R. The variation in the twist angle θ is less than 2° between the start 3 of the airfoil portion 4 and the second section S2. The twist angle θ increases a little and then decreases along the span, the twist gradient being positive in the vicinity of the start 3 of the airfoil portion 4 and decreasing to become negative in the vicinity of the second section S2.

Thereafter, the twist angle θ decreases between the second section S2 and a third section S3 situated at a third distance from the axis of rotation A equal to 0.48R, the twist gradient decreasing to a first plateau equal to −18°/R in the vicinity of the third section S3.

Thereafter, the twist angle θ decreases less between the third section S3 and a fourth section S4 situated at a fourth distance from the axis of rotation A equal to 0.78R, the twist gradient increases up to a second plateau equal to −6°/R in the vicinity of the fourth section S4. In particular, the twist angle θ is equal to 0° for a profile 15 of the blade 1 situated at a distance from the axis of rotation A equal to 0.7R.

The twist angle θ again decreases more between the fourth section S4 and a fifth section S5 situated at a fifth distance from the axis of rotation A equal to 0.92R, the twist gradient decreasing to a third plateau equal to −13°/R in the vicinity of the fifth section S5.

Finally, the twist angle θ decreases between the fifth section S5 and the blade tip 9, the twist gradient increasing up to a twist gradient equal to −8°/R at the blade tip 9.

This twist relationship combined with the relationships for variation in the chord of the profiles 15 of the sections of the blade 1 serves to improve the aerodynamic performance of the blade 1, both during hovering flight and during forward flight.

The relationship for variation in the sweep of the blade as shown in FIG. 5 defines three sweeps. The ratio of the position of the profile 15 of each section of the blade 1 along the blade axis B over the rotor radius R is plotted along the abscissa axis, and the sweep angle α of each of these profiles 15 is plotted up the ordinate axis.

Thus, the sweep is initially directed towards the front of the blade 1 between the start 3 of the airfoil portion 4 and a ninth section S9 situated at an eleventh distance from the axis of rotation A equal to 0.67R, the leading edge 6 forming a forward first sweep angle $α_1$ equal to 4° relative to the blade axis B. Thereafter, the sweep is directed towards the front of the blade 1 between the ninth section S9 and a tenth section S10 situated at a twelfth distance from the axis of rotation A equal to 0.85R, the leading edge 6 forming a forward second sweep angle $α_2$ equal to 8° relative to the blade axis B. Finally, the sweep is directed towards the rear of the blade 1 between the tenth section S10 and the blade tip 9, the leading edge 6 forming a backward third sweep angle $α_3$ equal to −23° relative to the blade axis B.

Each of the connections between the first, second, and third sweep angles is preferably made with a connection radius in order to avoid having a sharp angle at any of these connections. These connection radii may for example be of the order of 500 millimeters (mm).

Furthermore, the blade 1 has a downwardly-directed dihedral 5 at its free end. This dihedral 5 begins in the vicinity of the eighth section S8 and terminates at the blade tip 9. The dihedral 5 serves mainly to improve the aerodynamic behavior of the blade 1 in hovering flight by reducing the influence of the vortex generated by the preceding blade.

Naturally, the present invention may be subjected to numerous variations as to its implementation. Although several implementations are described, it will readily be understood that it is not conceivable to identify exhaustively all possible embodiments. It is naturally possible to envisage replacing any of the means described by equivalent means without going beyond the ambit of the present invention.

What is claimed is:

1. A blade for a rotor of a rotary wing aircraft, the blade being for rotating about an axis of rotation (A), the blade extending firstly along a blade axis (B) between a blade start suitable for being connected to a hub of the rotor and a blade tip situated at a free end of the blade, and secondly along a transverse axis (T) perpendicular to the blade axis (B) between a leading edge and a trailing edge, the blade comprising an airfoil portion situated between the blade start and the blade tip, the airfoil portion being constituted by a succession of airfoil profiles, each airfoil profile being situated in a transverse plane substantially perpendicular to the blade axis (B) and defining a section of the blade, the blade tip being situated at a distance equal to a rotor radius R from the axis of rotation (A), a maximum distance between the leading edge and the trailing edge in the transverse plane constituting a chord c for the airfoil profile of each of the sections of the blade, a mean chord $\bar{c}$ being a mean value of the chord c over the airfoil portion, a forward first direction being defined from the trailing edge to the leading edge, and a rearward second direction being defined from the leading edge to the trailing edge, the blade presenting a combination of relationships for variation in its chord and in its twist, the twist being formed by angular variations between the airfoil profiles of the blade, the chord increasing between the start of the airfoil portion and a first section S1 situated at a first distance from the axis of rotation (A) lying in the range 0.6R to 0.9R, the chord decreasing beyond the first section S1, and the twist decreasing between a second section S2 situated at a second distance from the axis of rotation (A) lying in the range 0.3R to 0.4R and the blade tip, a first gradient of the twist lying in the range −25°/R to −4°/R between the second section S2 and a third section S3 situated at a third distance from the axis of rotation (A) lying in the range 0.4R to 0.6R, a second gradient of the twist lying in the range −25°/R to −4°/R between the third section S3 and a fourth section S4 situated at a fourth distance from the axis of rotation (A) lying in the range 0.65R to 0.85R, a third gradient of the twist lying in the range −16°/R to −4°/R between the fourth section S4 and a fifth section S5 situated at a fifth distance from the axis of rotation (A) lying in the range 0.85R to 0.95R, a fourth gradient of the twist lying in the range −16°/R to 0°/R between the fifth section S5 and the blade tip, wherein the relationship for variation in its chord and in its twist are combined with a relationship for variation in its sweep, the sweep, which is the angle between the leading edge and the blade axis (B) being directed towards the front of the blade between the start of the airfoil portion and a ninth section S9 situated at an eleventh distance from the axis of rotation (A) lying between 0.5R and 0.8R, the leading edge forming a forward first sweep angle $α_1$ that is strictly greater than 0° and less than 10° relative to the blade axis (B), the sweep being directed towards the front of the blade between the ninth section S9 and a tenth section S10 situated at a twelfth distance from the axis of rotation (A) lying in the range 0.6R to 0.95R, the leading edge forming a forward second sweep angle $α_2$ lying in the range 1° to 15° relative to the blade axis (B), the sweep being directed towards the rear of the blade between the tenth section S10 and the blade tip, the leading edge forming a backward third sweep angle $α_3$ lying in the range −35° to −15° relative to the blade axis (B).

2. A blade according to claim 1, wherein the twist varies piecewise linearly between adjacent pairs of sections from the second, third, fourth, and fifth sections S2, S3, S4, and S5, and between the fifth section S5 and the blade tip.

3. A blade according to claim 2, wherein the first gradient of the twist is less than the second gradient of the twist, the third gradient of the twist is greater than the third gradient of the twist, and the third gradient of the twist is less than the fourth gradient of the twist.

4. A blade according to claim 1, wherein the twist varies in non-linear manner over the airfoil portion, the first gradient of the twist reaching a first plateau lying in the range −25°/R to −15°/R in the vicinity of the third section S3, the second gradient of the twist reaching a second plateau lying in the range −14°/R to −4°/R in the vicinity of the fourth section S4, the third gradient of the twist reaching a third plateau lying in the range −16°/R to −6°/R in the vicinity of the fifth section S5, and the fourth gradient of the twist lying in the range −10°/R to 0°/R in the vicinity of the blade tip.

5. A blade according to claim 4, wherein the first plateau is equal to −18°/R, the second plateau is equal to −6°/R, the third plateau is equal to −13°/R, and the fourth plateau of the twist is equal to −8°/R at the blade tip.

6. A blade according to claim 1, wherein the variation of the twist is less than or equal to 2° between the start of the airfoil portion and the second section S2.

7. A blade according to claim 1, wherein the second distance is equal to 0.35R, the third distance is equal to 0.48R, the fourth distance is equal to 0.78R, and the fifth distance is equal to 0.92R.

8. A blade according to claim 1, wherein the blade start is situated at a sixth distance lying in the range 0.05R to 0.3R from the axis of rotation (A) and the start of the airfoil portion is situated at a seventh distance lying in the range 0.1R to 0.4R from the axis of rotation (A), the seventh distance being greater than or equal to the sixth distance, and the chord in the vicinity of the start of the airfoil portion of the blade lying in the range $0.4\bar{c}$ to $0.9\bar{c}$.

9. A blade according to claim 1, wherein the chord varies about the mean chord $\bar{c}$ by ±40% between the start of the airfoil portion and the first section S1.

10. A blade according to claim 1, wherein the chord decreases in non-linear manner beyond an eighth section S8 situated at a tenth distance from the axis of rotation (A) lying in the range 0.9R to 0.95R to the blade tip.

11. A blade according to claim 10, wherein the chord decreases in parabolic manner beyond the eighth section S8.

12. A blade according to claim 1, wherein the blade has a dihedral in the vicinity of the blade tip.

13. A blade according to claim 1, wherein the forward first sweep angle $\alpha_1$ is different from the forward second sweep angle $\alpha_2$.

14. A blade according to claim 13, wherein the forward first sweep angle $\alpha_1$ is strictly less than the forward second sweep angle $\alpha_2$.

15. A blade according to claim 1, wherein the forward first sweep angle $\alpha_1$, the forward second sweep angle $\alpha_2$, and the backward third sweep angle $\alpha_3$ are constant respectively between the start of the airfoil portion and the ninth section S9, between the ninth section S9 and the tenth section S10, and between the tenth section S10 and the blade tip.

16. A blade according to claim 1, wherein the forward first sweep angle $\alpha_1$ is equal to 4°, the forward second sweep angle $\alpha_2$ is equal to 8°, and the backward third sweep angle $\alpha_3$ is equal to −23°.

17. A blade according to claim 1, wherein the mean chord $\bar{c}$ is defined by a radius squared $r^2$ weighting of the profile of each of the sections of the blade in application of the formula:

$$\bar{c} = \frac{\int_{R_0}^{R} L(r) \cdot r^2 \cdot dr}{\int_{R_0}^{R} r^2 \cdot dr}$$

where L(r) is the length of the local chord of a profile of the blade, the local profile being situated at a radius r from the axis of rotation A, $R_0$ being the radius of the start of the airfoil portion, and R being the radius of the blade tip.

18. A rotor for a rotary wing aircraft, the rotor having at least two blades according to claim 1.

* * * * *